E. C. RANEY.

AUTOMATIC CIRCUIT BREAKER.

APPLICATION FILED AUG. 24, 1914.

Reissued Dec. 29, 1914.

13,856.

2 SHEETS—SHEET 1.

WITNESSES:

Frederick H. Ivers.

Ethel Hambleton

Estelle C. Raney, INVENTOR.

BY Edwin P. Coxe

ATTORNEYS.

E. C. RANEY.

AUTOMATIC CIRCUIT BREAKER.

APPLICATION FILED AUG. 24, 1914.

Reissued Dec. 29, 1914.

13,856.

2 SHEETS—SHEET 2.

WITNESSES:

Frederick W. Ives.

Ethel Hambleton

Estelle C. Raney, INVENTOR.

BY Edwin P. Corbett

ATTORNEY.

UNITED STATES PATENT OFFICE.

ESTELLE C. RANEY, OF COLUMBUS, OHIO, ASSIGNOR TO THE AUTOMATIC RECLOSING CIRCUIT BREAKER COMPANY, OF COLUMBUS, OHIO.

AUTOMATIC CIRCUIT-BREAKER.

Specification of Reissued Letters Patent. Reissued Dec. 29, 1914.

13,856.

Original No. 1,041,161, dated October 15, 1912, Serial No. 674,123. Application for reissue filed August 24, 1914. Serial No. 858,416.

*To all whom it may concern:*

Be it known that I, ESTELLE C. RANEY, a citizen of the United States, and residing at Columbus, in the county of Franklin and State of Ohio, have invented certain new and useful Improvements in Automatic Circuit-Breakers, of which the following is a specification.

The present invention relates to improvements in a system of electrical distribution, in which a main circuit has branched therefrom a plurality of load circuits, each load circuit being provided with a circuit breaking mechanism which will automatically close after being opened by an overload, or by a short circuiting, of the load circuit.

The present invention is an improvement upon the automatic circuit breaker shown in Patent No. 1,005,575 granted to E. C. Raney and C. E. Simmons of October 10, 1911, the present operating in a somewhat similar manner and for the same purpose and being a much more sensitive apparatus.

The distinctive feature of the present invention over the one shown in the above mentioned patent, is the employment of a coil that is in parallel with any short circuit to the loads, the short circuit and coil being in series with a resistance. By this arrangement as will later appear, the coil being of low resistance, the change of current in such coil will be much greater for a given change of the short circuit, than the change of current in the coil 25, of the above patent, for the same change of resistance. Therefore, this parallel arrangement produces a more sensitive circuit breaker than the one illustrated in the above patent.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 2:
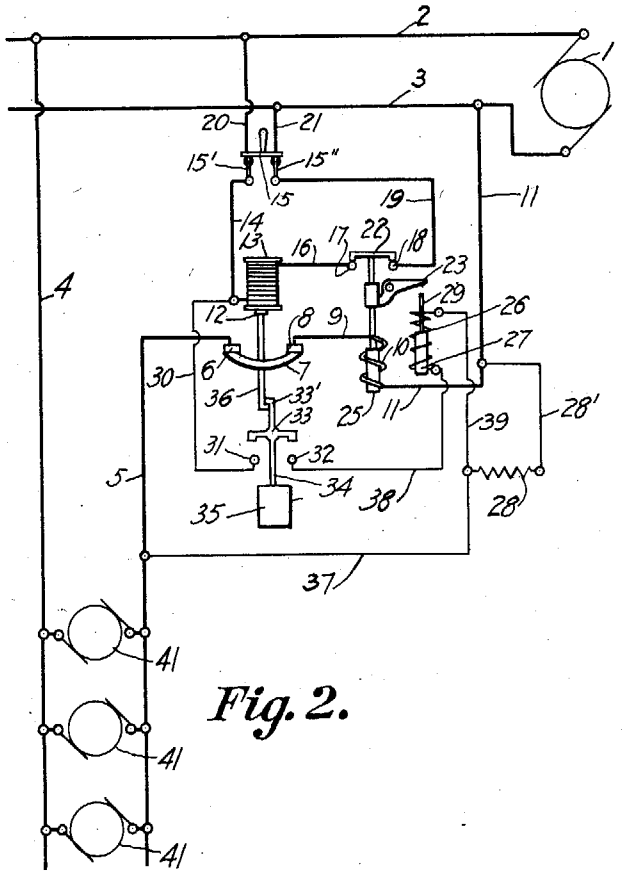
Figure 1:
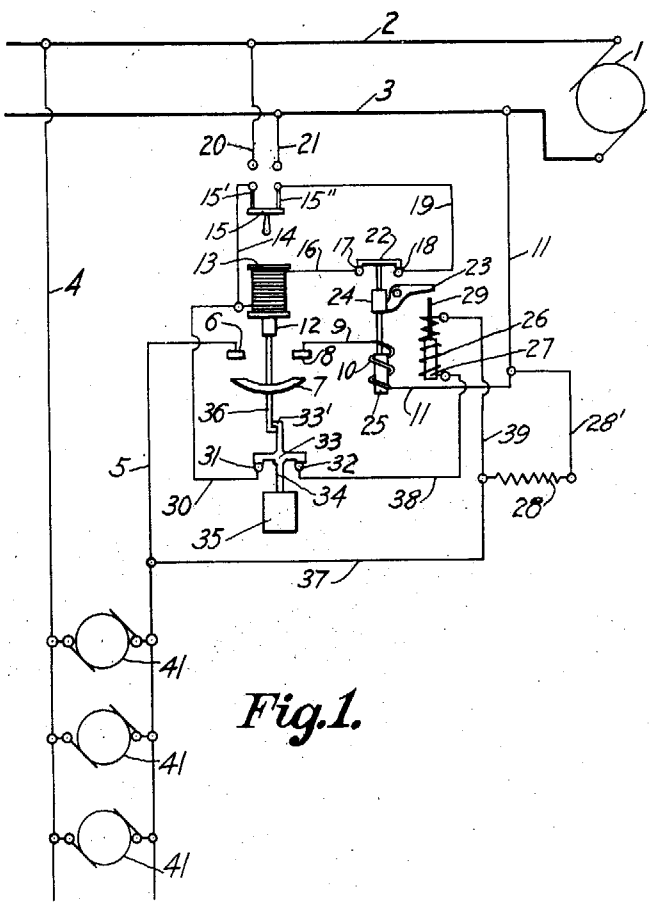
Figure 4:
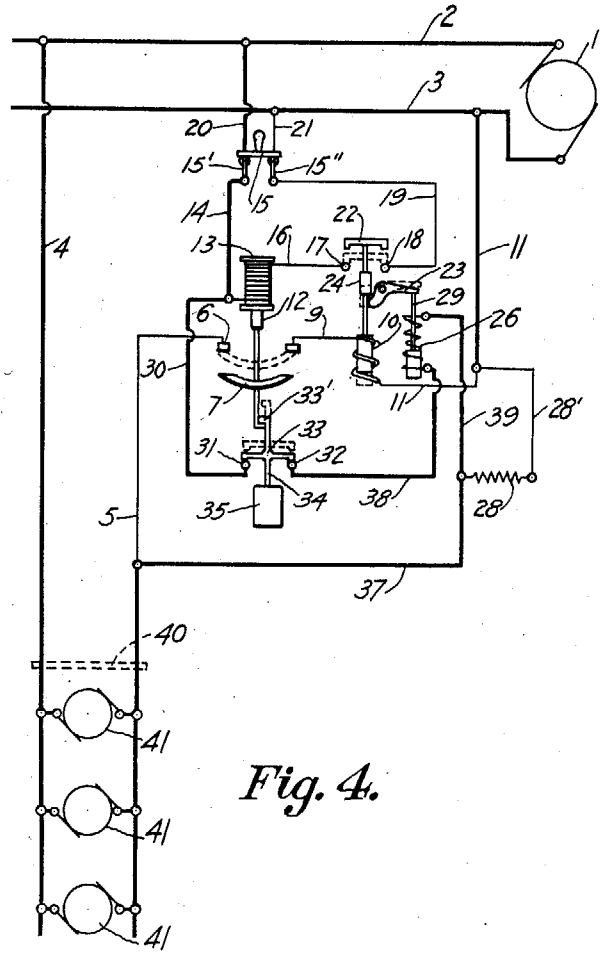
Figure 3:
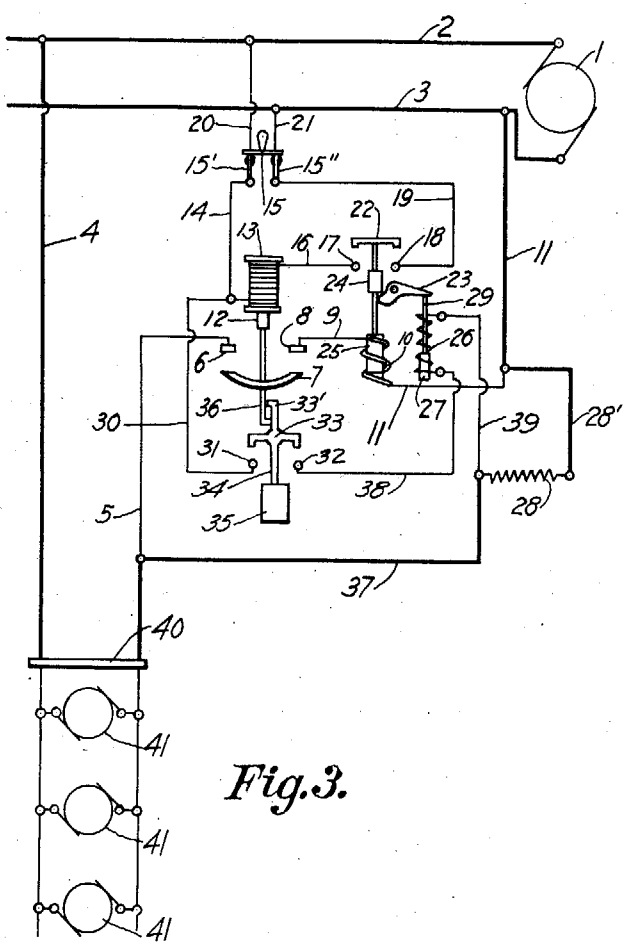

In the drawings—Figure 1 is a diagrammatic view of a main generator circuit, with a load circuit and circuit breaking apparatus disposed in operable relation thereto, the switch of the same being open so that no current is passing through said load circuit. Fig. 2 is a similar view to Fig. 1 with the switch closed, the heavy lines indicating the direction of the normal flow of current through the circuit breaking mechanism and the load. Fig. 3 is a diagrammatic view showing the flow of current at the first instance of a short circuit across the main branch between the circuit breaker and the load. Fig. 4 is a similar view showing the circuits formed automatically after the positioning of the various parts of the circuit breaker as illustrated in Fig. 3, dotted lines showing the final or normal condition of the apparatus automatically returned or restored.

Referring to the drawings, the numeral 1 designates a generator, having the feed lines 2 and 3, and connected with the feed line 2 is a conductor 4 constituting one of the circuit conductors of a motor or other load, as in this instance the motors 41 which are shown connected in parallel. The other circuit conductor 5 is connected to a contact point 6, which is engaged by a main switch or bridge connecting device 7 disposed to span and connect the contact points 6 and 8. The contact point 8 is connected by a conductor 9 with an overload coil 10, and this overload coil 10 is connected by a conductor 11 to the feed line conductor 3.

The main switch or bridging device 7 is carried by the core 12 of an operating solenoid or electromagnet 13, while a conductor 14 is connected to said solenoid or electromagnet 13 and to an arm 15′ of the double arm switch 15. A conductor wire 16 is connected to the magnet or solenoid 13 and to a contact point 17, while the opposite contact point 18, is connected by a conductor 19 to the arm 15″ of the switch 15. The respective conductors 20 and 21 are connected to the main line conductors 2 and 3 respectively, and are disposed to be connected to the respective conductor wires 14 and 19 through the medium of the arms 15′ and 15″, respectively, of the switch 15.

The contact points 17 and 18 are adapted to be bridged or connected through the medium of the overload switch 22, whose operating core 25′ carries an abutment 24 which is disposed in the line to be engaged by the hook of the trigger or lever 23, the purpose of which will presently appear.

The core 25 being the core of the overload coil 10, will under normal load and due to gravity, as clearly shown in Fig. 2, retain the bridge member or switch 22 into contact with the points 17 and 18 so that the circuits through the loads 41 will travel as indicated in the heavy lines Fig. 2. If an overload occurs, the core 25 will be propelled to raise the switch 22 to assume the position as shown in Fig. 3. Disposed so as to actuate the latch or hook 23, is a trip coil 26 controlling a core 27 provided with the trip releasing rod 29, whose upper end is disposed in coöperative relation with the free end of the tripping lever or hook 23. Branched from the conductor wire 11 is a branch conductor 28′, in which is mounted the resistance coil 28 whose outer terminal is connected to the conductor 39 which leads through the conductor 37 from the conductor 5, the said conductor 39 being connected to the coil 26. The conductor 30 is led from the conductor 14 to a contact point 31 which with the contact point 32 is adapted to be bridged by means of the cross arm bridging member or switch 33 provided with hooked upper end 33′, which is adapted to coact with the lower hooked end 36 of the core 12. The core 34 of the dash pot 35 is connected to and carries the bridging member 33. A conductor wire 38 is led from the contact point 32 to the opposite side of the coil 26 to the wire 39, thus producing all of the circuit connections of the automatically opening and closing circuit breaker herein illustrated.

From the foregoing description, the operation of the present device will be readily understood but briefly stated it is as follows: Supposing the conductors 4 and 5 to be a circuit supplying power from the conductors 2 and 3 to the respective loads 41, it is evident that in order to complete the circuit from the conductor 5 to the conductor 3, that the manually operated switch 15 is closed passing from the position as shown in Fig. 1 to the position as shown in Fig. 2. At this time the two arms 15′ and 15″ are connected to the respective short conductors 20 and 21 and thereby the electromagnet or solenoid 13 will be energized causing the switch 7 to be raised and make a complete connection between the contact points 6 and 8. Upon normal conditions the current will flow as indicated in heavy lines Fig. 2 and the loads 41 will be properly operated.

In order to clearly demonstrate the operation of the improved circuit breaking mechanism we will now suppose that a short circuit occurs as indicated by full lines at 40, Fig. 3, and dotted lines 40, in Fig. 4. In this instance an excessive current will now flow which acts upon the overload coil 10, thus raising the core 25 which in turn raises the bridge or switch 22, thus opening the circuit through the electromagnet 13 at contact points 17 and 18, this action, deënergizing the electromagnet or solenoid 13, permits the switch or bridge 7 to fall and thus assume the position as shown in Fig. 3 where the breaks are shown at 17 18 and 6 and 8, respectively. It will be noted that when the core 25 is raised by the overload current, that the latch 23 will engage the abutment 24 and thus hold the circuit at 17 and 18 open or until the said latch 23 is by some other means tripped or released.

It is therefore evident that the object of the latch 23 is to hold the bridge or switch 22 open, until the short circuit resistance 40 has been increased to such a volume as to prevent the flow of an overload current, or removed, and the main circuit is again closed through the contact points 6 and 8 and the bridge or switch 7.

With the bridge or switch 22 held open by the action of the trigger or trip 23, electromagnet 13 will be deënergized and bridge or switch 7 will instantly open, after which the switch or bridge 33 will slowly descend against the action of the dash pot 35, until the contact at points 31 and 32 is made, thus allowing current to flow as indicated in heavy lines (Fig. 4). With the parts in this position, the current will flow from the main conductor 2 to the main conductor 3 by either of the two circuits as illustrated first in Fig. 3 and secondly as illustrated in Fig. 4, in both instances the heavy lines indicating the flow of current. The first circuit that will be formed, namely that shown in Fig. 3, will comprise line 2, conductor 4, short circuit 40, wire 37, resistance 28, and wires 28′ and 11, to line 3. This is only for a short period, but of sufficient duration to allow the motors 41 to come to rest before the switch or bridge 32 is closed. The fall of the switch 7 will permit the bridge 33 to bridge contacts 31 and 32, to permit the current flowing through the resistance 28, to be divided in the circuit including conductors 14 and 30, contacts 31 and 32, bridge 33, conductor 38, coil 26, conductor 39, conductor 37, conductor 5, short circuit 40 and conductor 4, inversely proportionate to their respective resistances. As soon as the short circuit 40 is removed, or its resistance is increased to a predetermined amount, sufficient current will flow through the coil 26 to trip the latch 23. Upon closing the bridge or switch 33 during the further movement thereof from Fig. 3 to Fig. 4, the current will flow from line 2, conductor 20, arm 15′, conductor 14, conductor 30, the bridge or switch 33, through the respective points 31 and 32, conductor wire 38, the trip coil 26, conductor wire 39, the resistance 28, conductor wire 28′ and finally through the conductor wire 11 to the main line wire 3.

It may be noted here that the resistance 28 is large in comparison to the resistance of the trip coil 26 or the short circuit resistance 40. The total current which flows through the resistance 28 is small in comparison to the full load current, and this current will be divided between the above circuits as described, inversely proportional to their resistances, so as long as the resistance of the short circuit remains very low, there will be very little current flowing in circuits as illustrated in Fig. 4 through the coil 26. However, as soon as the resistance of the short circuit 40 is increased, more current is caused to flow in the coil 26 until a point is reached where the resistance of 40 has increased to a predetermined value and coil 26 will now have enough current flowing in it to raise the core 27, causing the rod 29 to trip latch 23 and thus the circuit through the contact point 17, the switch 22 and contact point 18 is again closed, which in turn causes the main circuit to be again closed between the contact points 6 and 8 and the switch 7, whereby the breaker in this manner protects the circuit from excessive current in case of short circuit or overloads, and automatically closes the circuit upon the removal of said short circuit or overloads.

The use of the dash pot 35 is to provide a time element so that the breaker will not open and reclose again before the motors 41 have come to a full rest. This is accomplished by having the dash pot so constructed that the plunger is free to rise but retarded in descending. It will also be noted that when the core 12 of the electromagnet or solenoid 13 is actuated and moved upwardly, that the arm 36 will also carry with it the bridging member or switch 32 thus opening the circuit at points 31 and 32 and cutting out the coil 26, this circuit being held open as long as the bridge or switch 7 is closed. It is also evident that when the bridge or switch 7 is opened by the action of the overload current, as above described, that the said bridge or switch 7 carrying the rod or hook 36 is free to open without causing 33 to close, but that the bridge or switch 33 will now descend slowly against the retarding action of the dash pot 35 which as before stated may be so regulated that the circuit contact points 31 and 32 will not be closed until the motors 41 will have come to a full stop or rest.

This form of circuit breaker is adaptable for use with both alternating and direct currents, and would necessitate only slight and obvious changes.

It will be noted that the conductor 37 plays an important part in this system, that is it makes it possible for a short circuit at 40, to shunt away a portion of the current, whose only path ordinarily would be from the conductor 11, through the conductor 28′ and resistance 28, to the conductor 39, thence through the coil 26 and the switch 33, and the conductors 30 and 14, the switch member 15′ to the conductor 20.

In the present apparatus the distinctive features of the same over the patent heretofore mentioned are first a substitution of a trip coil 26 and the latch or trip 23 in lieu of the holding coil 25 of said patent and second in the placing of the dash pot 35 to control the circuit through the coil 26 instead of the coil or magnet 13 as in the aforementioned patent.

In the present instance the trip coil 26 is in a parallel circuit with the short circuit 40, and as the coil 26 is a coil of low resistance, the change of current therein will be much greater for a given increase of resistance 40 than the change of current in the coil 25 as illustrated in the aforementioned patent, for the same increase of resistance, hence the arrangement in the present instance is much more sensitive to changes of short circuit or overload resistance than the arrangement in the beforementioned patent.

From the foregoing description it is therefore evident that this improved construction and arrangement of circuit breaker will automatically close after being opened by an overload, or short circuit, and is a more sensitive apparatus than the apparatus shown in the aforementioned patent.

While herein is described the invention in detail, and is illustrated a combination embodying various features, which may at times be used to advantage, it is not the desire or intention of claimant to be limited to the particular arrangement shown, or to an arrangement embodying the various auxiliary features, except as particularly pointed out in the appended claims.

What is claimed is:

1. In a system of electrical distribution, a generator, a load circuit, a circuit breaker in said load circuit, a circuit in parallel with the generator and closing after opening of the breaker, a limiting resistance in said last circuit, reclosing mechanism, a control for said reclosing mechanism operable by current in said last circuit, and a branch conductor connected at a point between said resistance and said control and leading to such a point in the load circuit that said branch conductor and any short circuit on the load are in series and together form a shunt to said control.

2. In a system of electrical distribution, a supply circuit, a load circuit, a circuit breaker in said load circuit, a resistance having one terminal connected to the supply side of the breaker, conductors leading from the opposite terminal of said resistance, one completing a shunt around said breaker and the other completing a circuit in parallel with said supply circuit, one of said conductors being in open circuit while said breaker is closed, means whereby the open circuit on the last conductor is closed after said breaker is opened, reclosing mechanism, and a control for said reclosing mechanism responsive to a current of definite value in one of said conductors.

3. In a system of electrical distribution, a supply circuit, a load circuit, a circuit breaker in said load circuit, a comparatively high resistance having one terminal connected to the supply side of the breaker, comparatively low resistance conductors leading from the opposite terminal of said resistance, one completing a shunt around said breaker and the other completing a circuit in parallel with said supply circuit, one of said conductors being in open circuit while said breaker is closed, means whereby the open circuit on the last conductor is closed after said breaker is opened, reclosing mechanism, and a control for said reclosing mechanism responsive to a current of definite value in one of said conductors.

4. In a system of electrical distribution, a supply circuit, a load circuit, a circuit breaker in said load circuit, a resistance having one terminal connected to the supply side of the breaker, one completing a shunt around said breaker and the other completing a circuit in parallel with said supply circuit, one of said conductors being in open circuit while said breaker is closed, means whereby the open circuit on the last conductor is closed after the said breaker is opened, reclosing mechanism, a control for said reclosing mechanism responsive to a current of definite value in one of said conductors, and means for producing a positive time interval after opening of the breaker and before said control is rendered operative and then rendering said control and reclosing means instantly operative in response to the removal of the overload.

5. In a system of electrical distribution, a supply circuit, a load circuit, a circuit breaker in said load circuit, means operative after the opening of said breaker to conduct the current to the line of opposite polarity but first reducing and subdividing said current and directing one subdivision through the load, a reclosing mechanism for the circuit breaker, and a control for said reclosing mechanism responsive to current in one of the subdivisions.

6. In a system of distribution, a supply circuit, a load circuit connected thereto, an electrically actuated circuit breaker in said load circuit, a circuit including said actuating mechanism of said circuit breaker, an overload coil in the load circuit, a switch for the circuit breaker actuating circuit controlled by the overload coil, a shunt around the circuit breaker in the load circuit including a resistance, a reclosing coil for the overload switch connected in an open shunt with the load circuit, and a switch controlled by the circuit breaker for closing the last shunt after a short circuit takes place in the load circuit, whereby the current flowing through the resistance will divide inversely proportional to the resistance of the reclosing coil and the short circuit.

7. In a system of distribution, a supply circuit, a load circuit connected thereto, a circuit breaker in said load circuit having a main switch held in closed position by an operating magnet, an overload switch in the operating magnet circuit with which an overload coil in the load circuit coöperates, means for locking said overload switch in open position, a coil and a resistance in a shunt circuit to the supply for tripping said locking means, a switch in said shunt circuit permitted to close by the opening of the main switch, and a conductor connected to the load side of the main and to the shunt circuit between the coil and resistance.

8. In a system of distribution, a supply circuit, a load circuit connected thereto, an electro-magnetically controlled circuit breaker for the load circuit, a shunt circuit from the supply circuit and including the electromagnet of the circuit breaker and normally energizing the same to hold the switch thereof closed, an overload switch in the shunt circuit, a coil controlling said overload switch disposed in the load circuit to operate the overload switch due to an overloading of the load circuit, means for locking the overload switch in open position, a locking device and a resistance in shunt with the supply circuit, a switch in said last shunt circuit disposed for closure by the opening of the main switch, and a conductor from the load side of the switch of the circuit breaker and to the last shunt circuit between the lock switch tripping device and the resistance.

In testimony that I claim the foregoing as my own, I have hereto affixed by signature in the presence of two witnesses.

ESTELLE C. RANEY.

Witnesses:
ETHEL HAMBLETON,
CHAS. I. STOUFFER.